United States Patent
Ersbo et al.

(10) Patent No.: US 12,401,446 B2
(45) Date of Patent: Aug. 26, 2025

(54) MODULATION AND CODING SCHEME (MCS) SIGNALLING FOR MULTI-CARRIER SCHEDULING

(71) Applicant: Telefonaktiebolaget LM Ericsson (publ), Stockholm (SE)

(72) Inventors: Petter Ersbo, Knivsta (SE); Zhanxian Wang, Täby (SE); Robert Baldemair, Solna (SE); Ajit Nimbalker, Dublin, CA (US); Ravikiran Nory, San José, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 403 days.

(21) Appl. No.: 18/006,601

(22) PCT Filed: Aug. 6, 2021

(86) PCT No.: PCT/EP2021/072065
§ 371 (c)(1),
(2) Date: Jan. 24, 2023

(87) PCT Pub. No.: WO2022/029317
PCT Pub. Date: Feb. 10, 2022

(65) Prior Publication Data
US 2023/0275683 A1   Aug. 31, 2023

Related U.S. Application Data

(60) Provisional application No. 63/062,565, filed on Aug. 7, 2020.

(51) Int. Cl.
| | |
|---|---|
| H04L 1/00 | (2006.01) |
| H04W 72/1263 | (2023.01) |
| H04W 72/232 | (2023.01) |

(52) U.S. Cl.
CPC ....... *H04L 1/0003* (2013.01); *H04W 72/1263* (2013.01); *H04W 72/232* (2023.01)

(58) Field of Classification Search
CPC .............. H04L 1/0003; H04W 72/232; H04W 72/1263
See application file for complete search history.

(56) References Cited

U.S. PATENT DOCUMENTS

| | | | |
|---|---|---|---|
| 10,880,895 B2 * | 12/2020 | Gordaychik | ........ H04W 72/044 |
| 2005/0025254 A1 * | 2/2005 | Awad | ....................... H04L 1/203 |
| | | | 375/295 |

(Continued)

FOREIGN PATENT DOCUMENTS

WO   WO-2018213315 A1 * 11/2018 ........... H04L 1/0003

OTHER PUBLICATIONS

International Search Report and Written Opinion dated Nov. 22, 2021 for International Application No. PCT/EP2021/072065 filed Aug. 6, 2021; consisting of 14 pages.

*Primary Examiner* — Jael M Ulysse
(74) *Attorney, Agent, or Firm* — Weisberg I.P. Law, P.A.

(57) ABSTRACT

A method, system and apparatus are disclosed. A network node configured to communicate with a wireless device is provided. The network node includes processing circuitry configured to indicate, in downlink control information, DCI, a first modulation and coding scheme, MCS, associated with first transport block, TB, indicate, in the DCI, a second MCS associated with a second TB where the first MCS is indicated by a first MCS field size and the second MCS is indicated by a second MCS field size less than the first MCS field size, and communicate with the wireless device based on the first MCS and the second MCS.

18 Claims, 8 Drawing Sheets

(56) References Cited

U.S. PATENT DOCUMENTS

| | | | |
|---|---|---|---|
| 2010/0195614 A1* | 8/2010 | Nimbalker | H04L 1/0025 370/330 |
| 2011/0243079 A1* | 10/2011 | Chen | H04B 7/0639 370/329 |
| 2016/0261393 A1* | 9/2016 | Chen | H04W 72/542 |
| 2017/0338932 A1* | 11/2017 | Lee | H04W 72/23 |
| 2018/0102928 A1* | 4/2018 | Larsson | H04L 1/0025 |
| 2018/0205517 A1* | 7/2018 | Shao | H04W 72/542 |
| 2018/0375697 A1* | 12/2018 | Chen | H04L 27/0008 |
| 2019/0190644 A1* | 6/2019 | Ugurlu | H04L 27/2607 |
| 2019/0288789 A1* | 9/2019 | Li | H04W 28/24 |
| 2019/0312708 A1* | 10/2019 | Bai | H04W 72/21 |
| 2020/0067628 A1* | 2/2020 | Xu | H04L 1/0004 |
| 2020/0112357 A1* | 4/2020 | Fakoorian | H04L 1/0009 |
| 2020/0204289 A1* | 6/2020 | Yoshimoto | H04L 1/0025 |
| 2020/0245372 A1* | 7/2020 | Lei | H04W 74/0833 |
| 2020/0314858 A1* | 10/2020 | Xu | H04W 72/21 |
| 2021/0185718 A1* | 6/2021 | Ying | H04L 1/0061 |
| 2021/0329614 A1* | 10/2021 | Park | H04L 1/0003 |
| 2022/0279551 A1* | 9/2022 | Liu | H04W 72/0446 |
| 2023/0006802 A1* | 1/2023 | Li | H04L 1/0009 |
| 2023/0038054 A1* | 2/2023 | Mu | H04W 72/23 |

* cited by examiner

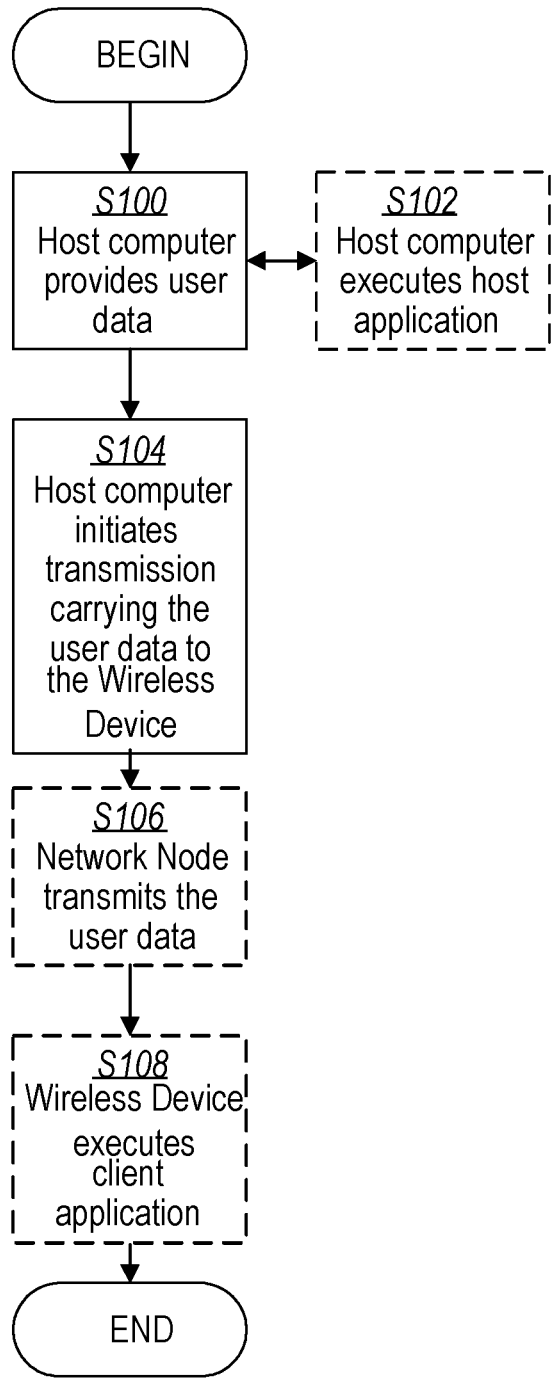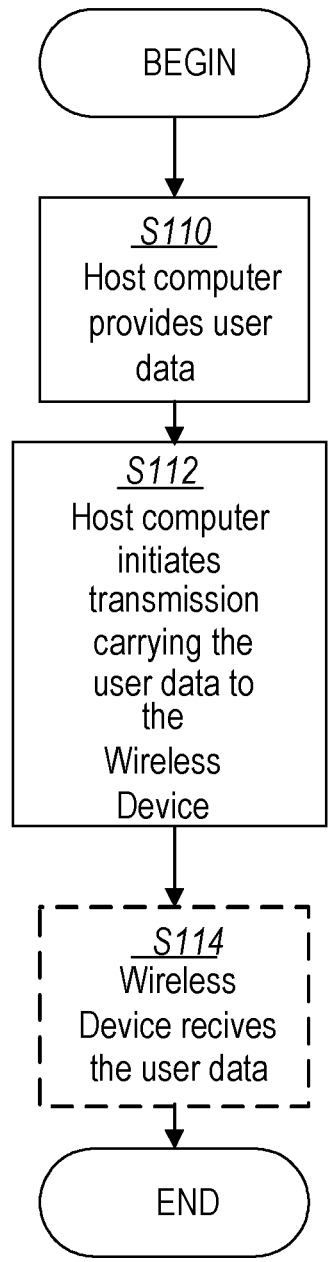
FIG. 3
FIG. 4

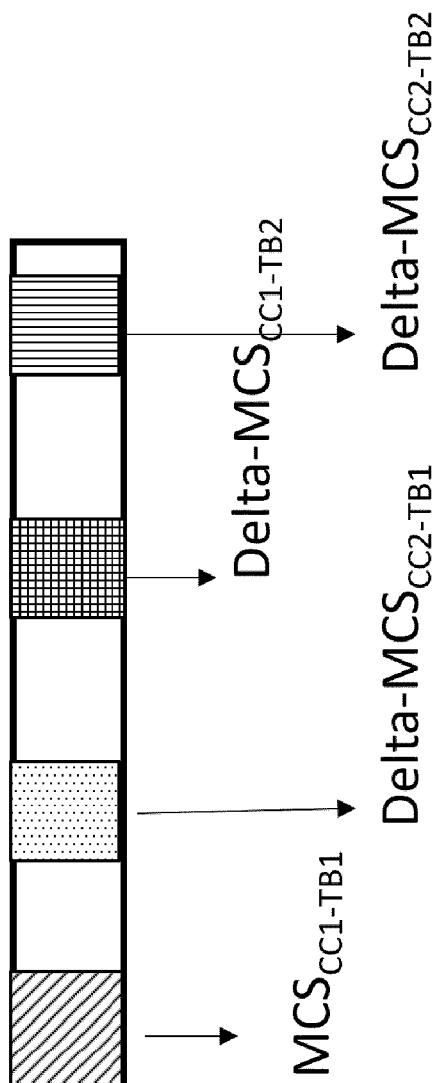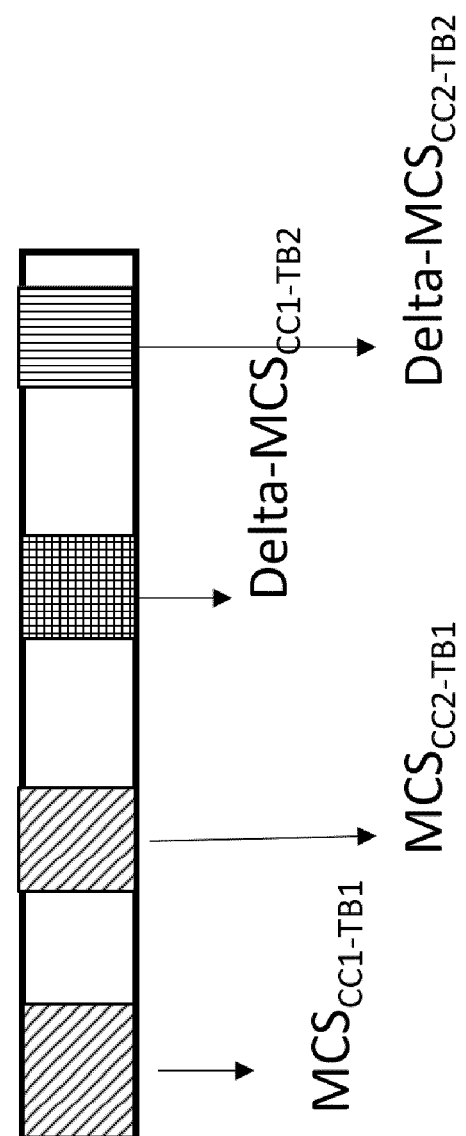

MODULATION AND CODING SCHEME (MCS) SIGNALLING FOR MULTI-CARRIER SCHEDULING

CROSS-REFERENCE TO RELATED APPLICATIONS

This application is a Submission Under 35 U.S.C. § 371 for U.S. National Stage Patent Application of International Application No.: PCT/EP2021/072065, filed Aug. 6, 2021 entitled "DIFFERENTIAL MODULATION AND CODING SCHEME (MCS) SIGNALLING FOR MULTI-CARRIER SCHEDULING," which claims priority to U.S. Provisional Application No. 63/062,565, filed Aug. 7, 2020, entitled "MCS CONFIGURATION FOR MULTI-CARRIER SCHEDULING," the entireties of both of which are incorporated herein by reference.

TECHNICAL FIELD

The present disclosure relates to wireless communications, and in particular, to modulation and coding scheme (MCS) signaling for multiple carriers scheduling.

BACKGROUND

To help ensure high flexibility and performance in New Radio (NR, also referred to as 5th Generation (5G)), it may be useful to have sufficient physical downlink control channel (PDCCH) capacity. Hence, enhancements to NR that increase PDCCH capacity and/or efficiency may be valuable.

A wireless device or user equipment (UE) can be configured to support communication in multiple cells. For one cell of the multiple cells, the wireless device can be configured to monitor one or more DCIs scheduling a single cell, and to monitor one or more DCIs scheduling multiple cells.

One possibility for increasing PDCCH capacity is to use a single downlink control information (DCI) on one carrier to schedule multiple carriers, which may be eventually studied in the Release 17 (Rel-17) of the Third Generation Partnership Project (3GPP) Dynamic Spectrum Sharing (DSS) Work Item (WI). This may increase PDCCH efficiency as some DCI fields can be shared, partially or fully, between the carriers. However, fully sharing DCI fields may greatly limit flexibility since each carrier will implement the same configuration/parameter indicated in the shared DCI field, which limits the flexibility in being able to provide different configurations for different carriers scheduled by the single DCI. That is, different carriers are likely to experience different radio environments such that it may be necessary to provide different configurations among the carriers, thereby limiting instances where sharing can be implemented. Hence, existing works fail to provide sharing of at least one DCI field where flexibility in configuration is not greatly limited and the impact on scheduling capacity is not negatively affected.

SUMMARY

Some embodiments advantageously provide methods, systems, and apparatuses for MCS signaling for multiple carriers scheduling.

By configuring a smaller MCS field or using a smaller-sized field in DCI to indicate relative MCS for some or all TB, the DCI size is reduced and scheduling capacity increased. Hence, in one or more embodiments, the disclosure advantageously reduces the size of the MCS field in the DCI for multi-carrier scheduling, with limited performance impact.

According to one aspect of the disclosure, a network node configured to communicate with a wireless device is provided. The network node includes processing circuitry configured to indicate, in downlink control information, DCI, a first modulation and coding scheme, MCS, associated with first transport block, TB, indicate, in the DCI, a second MCS associated with a second TB where the first MCS is indicated by a first MCS field size and the second MCS being indicated by a second MCS field size less than the first MCS field size, and communicate with the wireless device based on the first MCS and the second MCS.

According to one or more embodiments of this aspect, the first MCS corresponds to a first MCS value where the second MCS corresponds to a second MCS value that is an offset from the first MCS value. According to one or more embodiments of this aspect, the second MCS is configured to be derived based at least on the first MCS. According to one or more embodiments of this aspect, the second MCS value is indicated by the second MCS field. According to one or more embodiments of this aspect, the second MCS field size has at least one of a reduced MCS value range and reduced MCS value granularity compared to the first MCS field size. According to one or more embodiments of this aspect, the reduced MCS value range of the second MCS field size is configured based at least on at least one transmission characteristic associated with the DCI that indicates the second MCS.

According to one or more embodiments of this aspect, the at least one transmission characteristic indicates one of a retransmission is performed with a DCI type different from a DCI type associated with the second MCS, and the DCI associated with the second MCS field size schedules an initial transmission. According to one or more embodiments of this aspect, the reduced MCS value granularity corresponds to at least one predefined MCS value within a predefined MCS value range being skipped. According to one or more embodiments of this aspect, the second MCS field size is configured to be mapped to a MCS index based at least on the second MCS being associated with one of an initial transmission and a retransmission. According to one or more embodiments of this aspect, the first MCS is associated with communication on a first cell and the second MCS is associated with communication on a second cell. According to one or more embodiments of this aspect, the second MCS field size is less than five bits.

According to another aspect of the disclosure, a method implemented by a network node that is configured to communicate with a wireless device is provided. A first modulation and coding scheme, MCS, associated with first transport block, TB, is indicated in downlink control information, DCI. A second MCS associated with a second TB is indicated in the DCI where the first MCS is indicated by a first MCS field size and the second MCS is indicated by a second MCS field size less than the first MCS field size. Communication with the wireless device is performed based on the first MCS and the second MCS.

According to one or more embodiments of this aspect, the first MCS corresponds to a first MCS value where the second MCS corresponds to a second MCS value that is an offset from the first MCS value. According to one or more embodiments of this aspect, the second MCS is configured to be derived based at least on the first MCS. According to one or more embodiments of this aspect, the second MCS value is indicated by the second MCS field. According to one or more embodiments of this aspect, the second MCS field size has at least one of a reduced MCS value range and reduced MCS value granularity compared to the first MCS field size.

According to one or more embodiments of this aspect, the reduced MCS value range of the second MCS field size is configured based at least on at least one transmission characteristic associated with the DCI that indicates the second MCS. According to one or more embodiments of this aspect, the at least one transmission characteristic indicates one of: a retransmission is performed with a DCI type different from a DCI type associated with the second MCS, and the DCI associated with the second MCS field size schedules an initial transmission. According to one or more embodiments of this aspect, the reduced MCS value granularity corresponds to at least one predefined MCS value within a predefined MCS value range being skipped.

According to one or more embodiments of this aspect, the second MCS field size is configured to be mapped to a MCS index based at least on the second MCS being associated with one of an initial transmission and a retransmission. According to one or more embodiments of this aspect, the first MCS is associated with communication on a first cell and the second MCS is associated with communication on a second cell. According to one or more embodiments of this aspect, the second MCS field size is less than five bits.

According to another aspect of the disclosure, a wireless device configured to communicate with a network node is provided. The wireless device includes processing circuitry configured to: receive, in downlink control information, DCI, an indication of a first modulation and coding scheme, MCS, associated with first transport block, TB, receive, in the DCI, an indication of a second MCS associated with a second TB where the first MCS is indicated by a first MCS field size and the second MCS is indicated by a second MCS field size less than the first MCS field size, and communicate with the network node based on the first MCS and the second MCS.

According to one or more embodiments of this aspect, the first MCS corresponds to a first MCS value where the second MCS corresponding to a second MCS value that is an offset from the first MCS value, the second MCS value being indicated by the second MCS field. According to one or more embodiments of this aspect, the processing circuitry is configured to derive the second MCS based at least on the first MCS. According to one or more embodiments of this aspect, the second MCS value is indicated by the second MCS field. According to one or more embodiments of this aspect, the second MCS field size has at least one of a reduced MCS value range and reduced MCS value granularity compared to the first MCS field size.

According to one or more embodiments of this aspect, the reduced MCS value range of the second MCS field size is configured based at least on at least one transmission characteristic associated with the DCI that indicates the second MCS. According to one or more embodiments of this aspect, the at least one transmission characteristic indicates one of a retransmission is performed with a DCI type different from a DCI type associated with the second MCS, and the DCI associated with the second MCS field size schedules an initial transmission. According to one or more embodiments of this aspect, the reduced MCS value granularity corresponds to at least one predefined MCS value within a predefined MCS value range being skipped.

According to one or more embodiments of this aspect, the second MCS field size is configured to be mapped to a MCS index based at least on the second MCS being associated with one of an initial transmission and a retransmission. According to one or more embodiments of this aspect, the first MCS is associated with communication on a first cell and the second MCS is associated with communication on a second cell. According to one or more embodiments of this aspect, the second MCS field size is less than five bits.

According to another aspect of the disclosure, a method implemented by a wireless device that is configured to communicate with a network node is provided. An indication of a first modulation and coding scheme, MCS, associated with first transport block, TB, is received in downlink control information, DCI. An indication of a second MCS associated with a second TB is received in the DCI. The first MCS is indicated by a first MCS field size and the second MCS is indicated by a second MCS field size less than the first MCS field size. Communication with the network node is performed based on the first MCS and the second MCS.

According to one or more embodiments of this aspect, the first MCS corresponds to a first MCS value where the second MCS corresponding to a second MCS value that is an offset from the first MCS value, the second MCS value being indicated by the second MCS field. According to one or more embodiments of this aspect, the second MCS is derived based at least on the first MCS. According to one or more embodiments of this aspect, the second MCS value is indicated by the second MCS field. According to one or more embodiments of this aspect, the second MCS field size has at least one of a reduced MCS value range and reduced MCS value granularity compared to the first MCS field size. According to one or more embodiments of this aspect, the reduced MCS value range of the second MCS field size is configured based at least on at least one transmission characteristic associated with the DCI that indicates the second MCS.

According to one or more embodiments of this aspect, the at least one transmission characteristic indicates one of a retransmission is performed with a DCI type different from a DCI type associated with the second MCS, and the DCI associated with the second MCS field size schedules an initial transmission. According to one or more embodiments of this aspect, the reduced MCS value granularity corresponds to at least one predefined MCS value within a predefined MCS value range being skipped. According to one or more embodiments of this aspect, the second MCS field size is configured to be mapped to a MCS index based at least on the second MCS being associated with one of an initial transmission and a retransmission. According to one or more embodiments of this aspect, the first MCS is associated with communication on a first cell and the second MCS is associated with communication on a second cell. According to one or more embodiments of this aspect, the second MCS field size is less than five bits.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating example methods implemented in a communication system including a host computer, a network node and a wireless device for executing a client application at a wireless device according to some embodiments of the present disclosure;

FIG. 4 is a flowchart illustrating example methods implemented in a communication system including a host computer, a network node and a wireless device for receiving user data at a wireless device according to some embodiments of the present disclosure;

FIG. 13 is a diagram of another example of DCI scheduling multiple cells and multiple TBs according to some embodiments of the present disclosure; and FIG. 14 is a diagram of one example of DCI scheduling multiple cells and multiple TBs according to some embodiments of the present disclosure.

DETAILED DESCRIPTION

Figure 1:
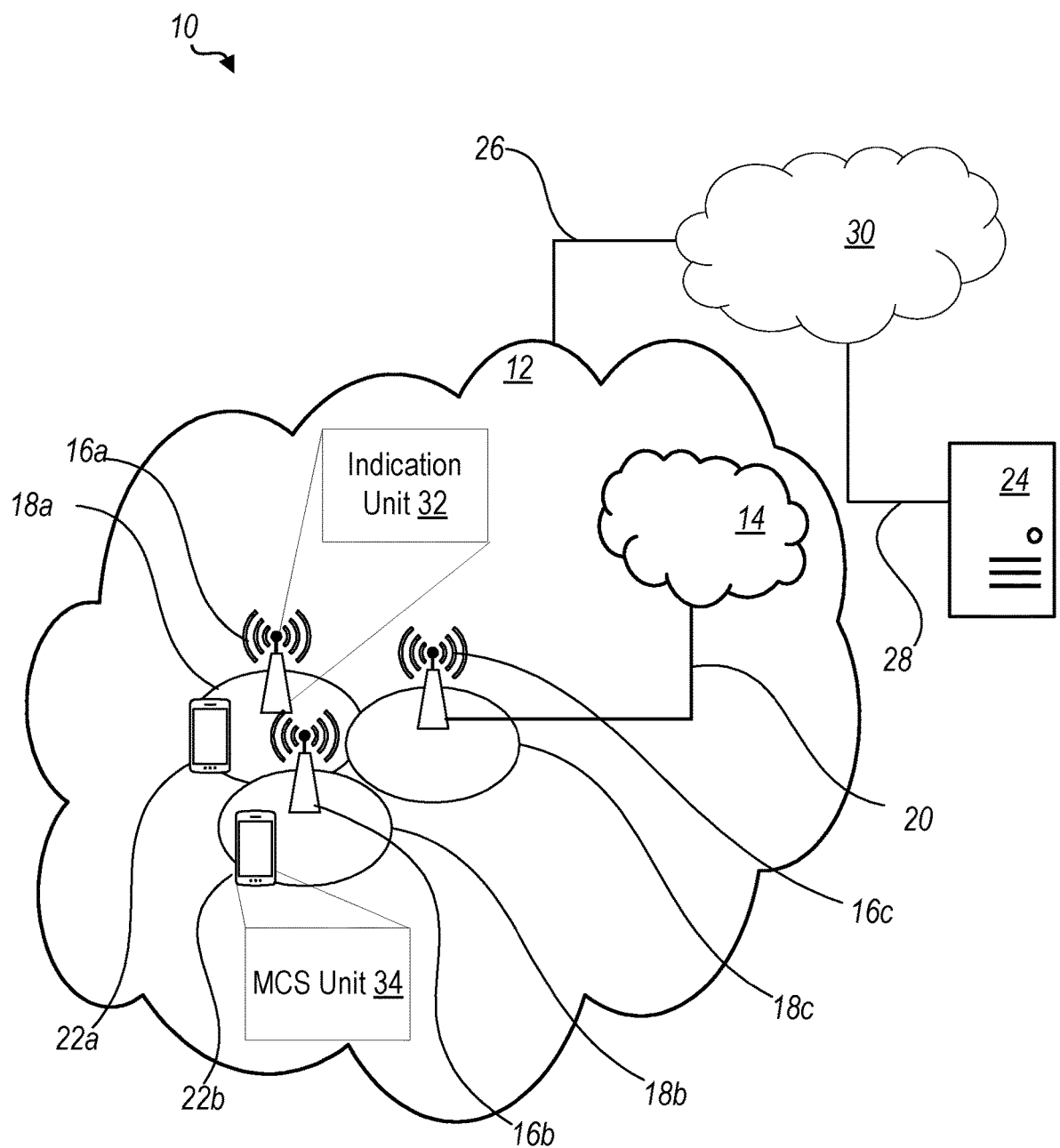
FIG. 1 is a schematic diagram of an example network architecture illustrating a communication system connected via an intermediate network to a host computer according to the principles in the present disclosure.

In existing works, one DCI field cannot be shared fully without significantly limiting flexibility in, for example, the modulation and coding scheme (MCS) field. As different carriers are likely to experience different radio environments, it may be necessary to be able to use different MCS for different carriers, thereby limiting the sharing of the DCI field in these works. In particular, the MCS field in existing DCI formats such as those defined in existing 3GPP standards is five bits long for each transport block (TB). Up to two TBs may be scheduled for a cell with the same DCI. However, not being able to fully share the DCI field (e.g., the MCS field) in order to, for example, maintain flexibilty, leads to having to configure full (five bit) MCS fields in the DCI for all TBs in multi-carrier scheduling resulting in a large DCI size, which in turn has a negative impact on scheduling capacity.

One or more embodiments described herein at least help solve the problem with the limited flexibility and impact on scheduling capacity of existing systems. The one or more embodiments provide MCS signaling for multiple carriers scheduling where a wireless device can be configured, such as by a network node, to support communication in multiple cells. For one cell of the multiple cells, the wireless device can be configured to monitor one or more DCIs scheduling a single cell, and to monitor one or more DCIs scheduling multiple cells. For a DCI (e.g., single DCI) scheduling multiple cells, only a portion of the DCI may contain scheduling information relevant for each cell.

In order to increase PDCCH efficiency, some DCI fields in, for example, a single DCI, can advantageously be shared, partially or fully, between the carriers as described herein without limited flexibility in being able to use, for example, different MCSs. In some embodiments, solutions are provided to share the DCI fields among the multiple carriers in an intelligent manner such as to maintain flexibility without unnecessarily increasing of the DCI size.

Before describing in detail example embodiments, it is noted that the embodiments reside primarily in combinations of apparatus components and processing steps related to MCS signaling for multiple carriers scheduling. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device) or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

As used herein, a "carrier" may be used interchangeably with "cell."

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide MCS signaling for multiple carriers scheduling. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16a. A second wireless device 22b in coverage area 18b is wirelessly connectable to the corresponding network node 16b. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected wireless devices 22*a*, 22*b* and the host computer 24. The connectivity may be described as an over-the-top (OTT) connection. The host computer 24 and the connected wireless devices 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22*a*. Similarly, the network node 16 need not be aware of the future routing of an outgoing uplink communication originating from the wireless device 22*a* towards the host computer 24.

A network node 16 is configured to include a configuration unit 32 which is configured to perform one or more network node 16 functions as described herein such as with respect to MCS signaling for multiple carriers scheduling. A wireless device 22 is configured to include a MCS unit 34 which is configured to perform one or more wireless device 22 function as described herein such as with respect to MCS signaling for multiple carriers scheduling.

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to determine, process, provide, store, configure, transmit, receive, relay, forward, etc., information related to MCS signaling for multiple carriers scheduling that is described herein.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform one or more network node 16 functions as described herein such as with respect to MCS signaling for multiple carriers scheduling.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a MCS unit 34 configured to perform one or more wireless device 22 functions as described herein such as with respect to MCS signaling for multiple carriers scheduling.

Figure 2:
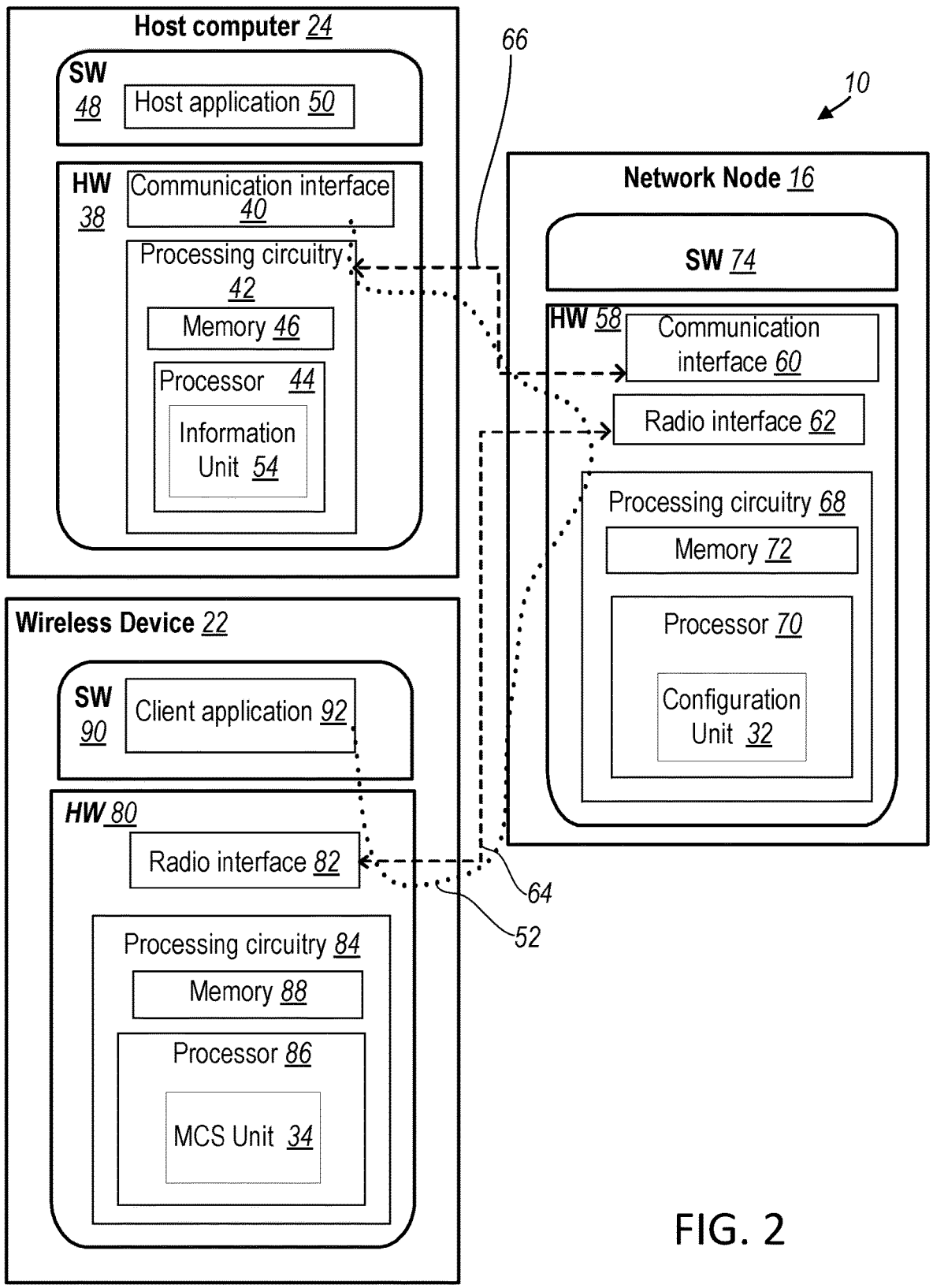
FIG. 2 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as configuration unit 32, and MCS unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an example method implemented in a communication system, such as, for example, the communication system of FIGS. 1 and 2, in accordance with one embodiment. The communication system may include a host computer 24, a network node 16 and a wireless device 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a wireless device 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

Figures 5, 6:
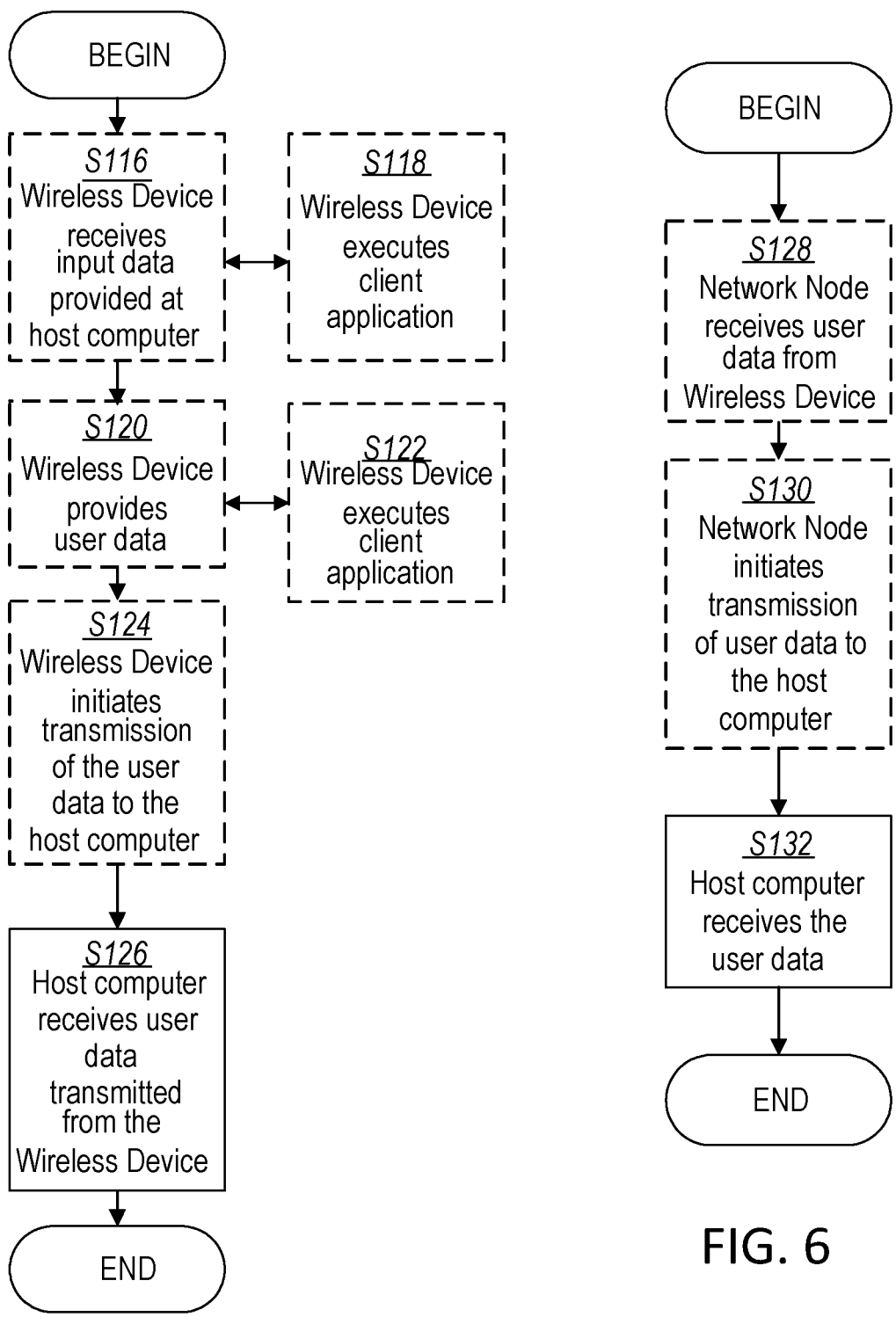
FIG. 5 is a flowchart illustrating example methods implemented in a communication system including a host computer, a network node and a wireless device for receiving user data from the wireless device at a host computer according to some embodiments of the present disclosure.
FIG. 6 is a flowchart illustrating example methods implemented in a communication system including a host computer, a network node and a wireless device for receiving user data at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, the wireless device 22 receives input data provided by the host computer 24 (Block S116). In an optional substep of the first step, the wireless device 22 executes the client application 92, which provides the user data in reaction to the received input data provided by the host computer 24 (Block S118). Additionally or alternatively, in an optional second step, the wireless device 22 provides user data (Block S120). In an optional substep of the second step, the wireless device provides the user data by executing a client application, such as, for example, client application 92 (Block S122). In providing the user data, the executed client application 92 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a wireless device 22, which may be those described with reference to FIGS. 1 and 2. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
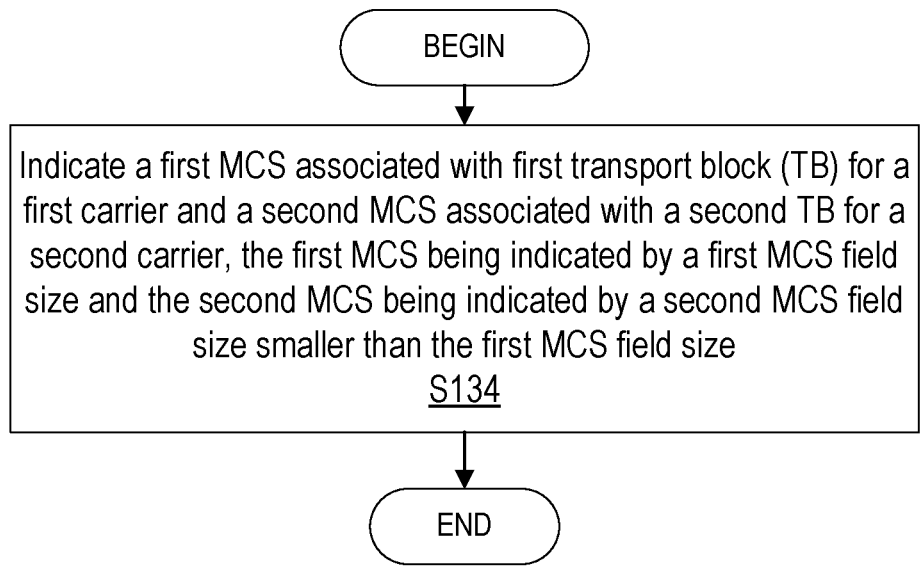
FIG. 7 is a flowchart of an example process implemented by a network node according to some embodiments of the present disclosure.

FIG. 7 is a flowchart of an example process in a network node 16 according to one or more embodiments of the disclosure. One or more Blocks and/or functions performed by network node 16 may be performed by one or more elements of network node 16 such as by configuration unit 32 in processing circuitry 68, processor 70, radio interface 62, etc. In one or more embodiments, network node 16 such as via one or more of processing circuitry 68, processor 70, configuration unit 32, communication interface 60 and radio interface 62 is configured to indicate (Block S134) a first MCS associated with first transport block (TB) for a first carrier and a second MCS associated with a second TB for a second carrier where the first MCS is indicated by a first MCS field size and the second MCS is indicated by a second MCS field size smaller than the first MCS field size, as described herein.

According to one or more embodiments, the second MCS is configured to be derived based at least on the first MCS, as described herein. According to one or more embodiments, the second MCS field size has at least one of a reduced range and reduced granularity compared to the first MCS field size. According to one or more embodiments, the first MCS field size is configured to be mapped to a first MCS index based on the first MCS being associated with an initial transmission where the first MCS field size is configured to be mapped to a second MCS index based on the first MCS being associated with a retransmission, as described herein.

Figure 8:
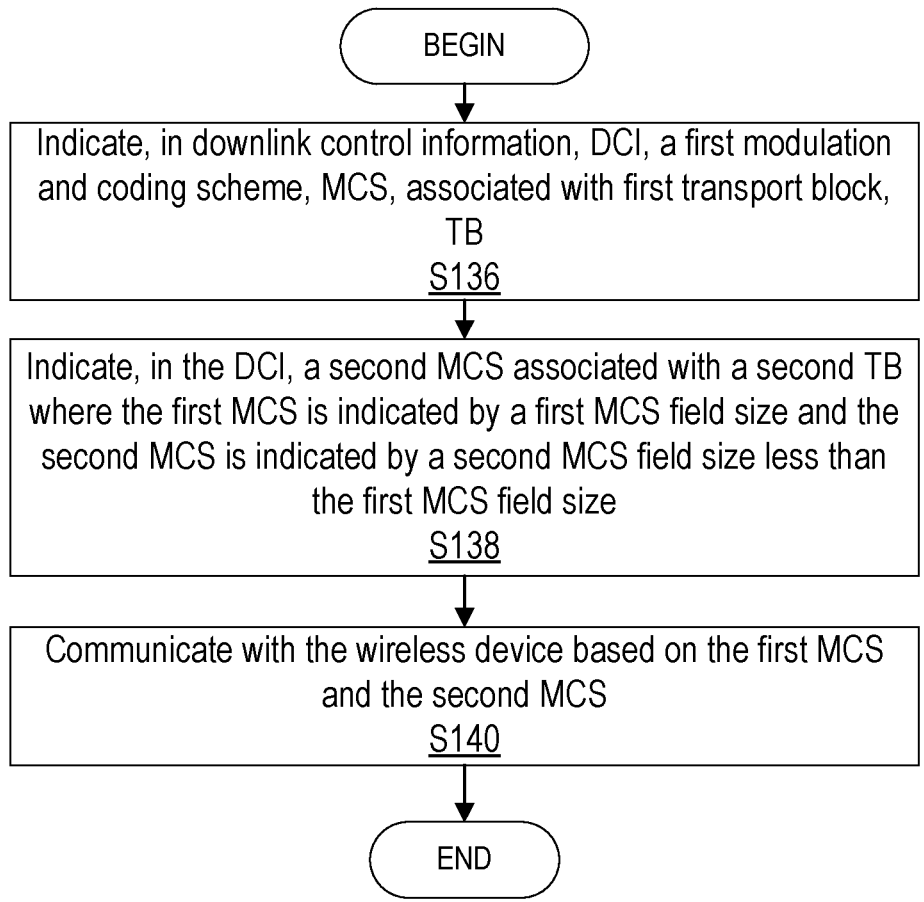
FIG. 8 is a flowchart of another example process implemented by a network node according to some embodiments of the present disclosure.

FIG. 8 is a flowchart of another example process in a network node 16 according to one or more embodiments of the disclosure. One or more Blocks and/or functions performed by network node 16 may be performed by one or more elements of network node 16 such as by configuration unit 32 in processing circuitry 68, processor 70, radio interface 62, etc. In one or more embodiments, network node 16 is configured to indicate (Block S136), in downlink control information (DCI), a first modulation and coding scheme, MCS, associated with first transport block, TB, as described herein. The network node 16 configured to indicate (Block S138), in the DCI, a second MCS associated with a second TB where the first MCS is indicated by a first MCS field size and the second MCS being indicated by a second MCS field size less than the first MCS field size, as described herein. The network node 16 is configured to communicate (Block S140) with the wireless device 22 based on the first MCS and the second MCS, as described herein.

According to one or more embodiments of this aspect, the first MCS corresponds to a first MCS value where the second MCS corresponds to a second MCS value that is an offset from the first MCS value. According to one or more embodiments of this aspect, the second MCS is configured to be derived based at least on the first MCS. According to one or more embodiments of this aspect, the second MCS value is indicated by the second MCS field. According to one or more embodiments, the second MCS field size has at least one of a reduced MCS value range and reduced MCS value granularity compared to the first MCS field size.

According to one or more embodiments, the reduced MCS value range of the second MCS field size is configured based at least on at least one transmission characteristic associated with the DCI that indicates the second MCS. According to one or more embodiments, the at least one transmission characteristic indicates one of a retransmission is performed with a DCI type different from a DCI type associated with the second MCS, and the DCI associated with the second MCS field size schedules an initial transmission. According to one or more embodiments, the reduced MCS value granularity corresponds to at least one predefined MCS value within a predefined MCS value range being skipped.

According to one or more embodiments, the second MCS field size is configured to be mapped to a MCS index based at least on the second MCS being associated with one of an initial transmission and a retransmission. According to one or more embodiments, the first MCS is associated with communication on a first cell and the second MCS is associated with communication on a second cell. According to one or more embodiments, the second MCS field size is less than five bits.

Figure 9:
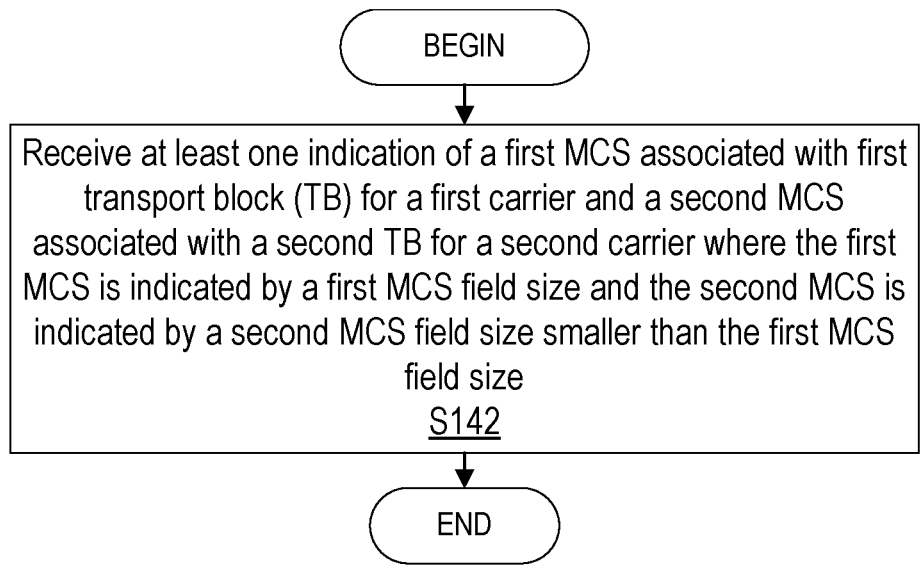
FIG. 9 is a flowchart of an example process implemented by a wireless device according to some embodiments of the present disclosure.

FIG. 9 is a flowchart of an example process in a wireless device 22 according to some embodiments of the present disclosure. One or more Blocks and/or functions performed by wireless device 22 may be performed by one or more elements of wireless device 22 such as by MCS unit 34 in processing circuitry 84, processor 86, radio interface 82, etc. In one or more embodiments, wireless device is configured to receive (Block S142) at least one indication of a first MCS associated with first transport block (TB) for a first carrier and a second MCS associated with a second TB for a second carrier where the first MCS is indicated by a first MCS field size and the second MCS is indicated by a second MCS field size smaller than the first MCS field size, as described herein.

According to one or more embodiments, the processing circuitry 84 is configured to derive the second MCS based at least on the first MCS, as described herein. According to one or more embodiments, the second MCS field size has at least one of a reduced range and reduced granularity compared to the first MCS field size. According to one or more embodiments, the processing circuitry 84 is further configured to: map the first MCS field size to a first MCS index based on the first MCS being associated with an initial transmission, and map the second MCS field size to a second MCS index based on the second MCS being associated with a retransmission.

Figure 10:
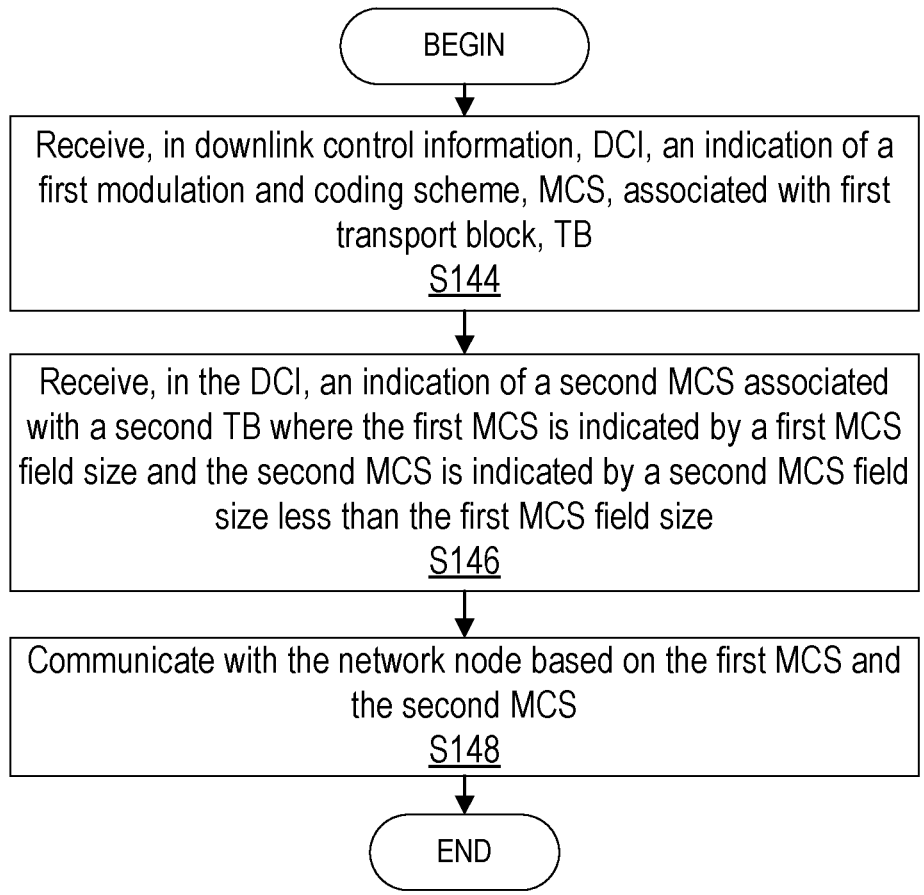
FIG. 10 is a flowchart of another example process implemented by a wireless device according to some embodiments of the present disclosure.

FIG. 10 is a flowchart of another example process in a wireless device 22 according to some embodiments of the present disclosure. One or more Blocks and/or functions performed by wireless device 22 may be performed by one or more elements of wireless device 22 such as by MCS unit 34 in processing circuitry 84, processor 86, radio interface 82, etc. In one or more embodiments, wireless device 22 is configured to receive (Block S144), in downlink control information (DCI), an indication of a first modulation and coding scheme, MCS, associated with first transport block, TB, as described herein. The wireless device 22 is configured to receive (Block S146), in the DCI, an indication of a second MCS associated with a second TB, the first MCS being indicated by a first MCS field size and the second MCS being indicated by a second MCS field size less than the first MCS field size, as described herein. The wireless device 22 is configured to communicate (Block S148) with the network node 16 based on the first MCS and the second MCS, as described herein.

According to one or more embodiments of this aspect, the first MCS corresponds to a first MCS value where the second MCS corresponding to a second MCS value that is an offset from the first MCS value, the second MCS value being indicated by the second MCS field. According to one or more embodiments of this aspect, the processing circuitry 84 is configured to derive the second MCS based at least on the first MCS. According to one or more embodiments of this aspect, the second MCS value is indicated by the second MCS field. According to one or more embodiments, the second MCS field size has at least one of a reduced MCS value range and reduced MCS value granularity compared to the first MCS field size. According to one or more embodiments, the reduced MCS value range of the second MCS field size is configured based at least on at least one transmission characteristic associated with the DCI that indicates the second MCS.

According to one or more embodiments, the at least one transmission characteristic indicates one of a retransmission is performed with a DCI type different from a DCI type associated with the second MCS, and the DCI associated with the second MCS field size schedules an initial transmission. According to one or more embodiments, the reduced MCS value granularity corresponds to at least one predefined MCS value within a predefined MCS value range being skipped. According to one or more embodiments, the second MCS field size is configured to be mapped to a MCS index based at least on the second MCS being associated with one of an initial transmission and a retransmission.

According to one or more embodiments, the first MCS is associated with communication on a first cell and the second MCS is associated with communication on a second cell. According to one or more embodiments, the second MCS field size is less than five bits.

Having generally described arrangements for MCS signaling for multiple carriers scheduling, details for these arrangements, functions and processes are provided as follows, and which may be implemented by the network node 16, wireless device 22 and/or host computer 24. One or more network node 16 functions described below may be performed by one or more of processing circuitry 68, processor 70, radio interface 62, configuration unit 32, etc. One or more wireless device 22 functions described below may be performed by one or more of processing circuitry 84, processor 86, MCS unit 34, radio interface 82, etc.

DCI scheduling a single cell can be DCI format 1-0/1-1/1-2 for downlink. DCI scheduling a single cell can be DCI format 0-0/0-1/0-2 for uplink. The embodiments described below relate to enhancing the MCS field in DCI for scheduling multiple cells. The DCI scheduling multiple cells may be denoted by "DCI 1-N" or "DCI format 1-N".

The size of the MCS field in the DCI scheduling multiple cells may be reduced by, for example, not using the full MCS range and granularity, for one or more TBs of one or more cells. For example, few or none of the lowest MCS values may be needed if retransmissions are performed with another DCI type (e.g., DCI scheduling single cell). Further, the full MCS granularity may not be needed, and it might be sufficient to have/include/use, e.g., every third MCS value. Furthermore, in 3GPP NR and Long Term Evolution (LTE, also referred to as $4^{th}$ Generation (4G)) the highest three (or four) MCS values (e.g., MCS 29, 30, 31) may be reserved for indicating re-transmissions with implicit MCS and TB size determination, which are not needed if the DCI scheduling multiple cells schedules only initial transmissions (and possibly retransmissions with explicit MCS and TB size determination).

Since it is likely that two TBs on the same carrier experience similar channel characteristics or because the differential channel state information (CSI) may be reported for two TBs on the same carrier, the full MCS field may not be needed for both TBs. Instead, the MCS for the second TB could be set by a delta-MCS, indicating an offset from the MCS for the first TB.

The different carriers may also share some channel characteristics such as if they are in the same band. The delta-MCS method may therefore also be used by network node 16 for indicating the MCS for other carriers in, for example, the same band.

In one embodiment, the network node 16 may configure the first TB on each carrier to have a full (five bit) MCS field and the second TB to have a smaller (e.g., three bit) delta-MCS field where the full MCS field and the smaller delta-MCS field are part of a single DCI/DCI transmission. The MCS (or MCS index) corresponding to the second TB is derived based on the MCS (or MCS index) for the first TB and the delta-MCS field.

In one embodiment, the network node 16 may configure only the first TB on one carrier to have a full (five bit) MCS field while the other carriers and TB(s) have a smaller delta-MCS field. The MCS (or MCS index) corresponding to TBs other than the first TB on the one carrier is derived based on the MCS (or MCS index) for the first TB on the one carrier and the corresponding delta-MCS fields for the respective TBs. For example, a MCS for a second TB may be derived, for example, by wireless device 22 from the MCS for the first TB while the remaining MCSs for the remaining TBs for the multiple carriers may be derived from the MCS for the first TB or a combination of the MCS for the first TB and at least one MCS for the second and/or remaining TBs.

The MCS field and the delta-MCS field are present in a single DCI that schedules multiple cells as may be configured by network node 16. In certain embodiments, the MCS field and the delta-MCS field are present only in the DCI scheduling multiple cells as may be configured by network node 16.

In one embodiment, the first TB on one carrier has a reduced range and/or granularity of MCS field (e.g., three bit where the reduced in the bits in the MCS field reduces the range and/or granularity) and the other carriers and TB have smaller (e.g., two bit) delta-MCS field as may be configured by network node 16.

For example, a 3-bit reduced range MCS can be configured by network node 16 to indicate one of eight MCS values between MCS0 and MCS7 (e.g., spectral efficiency ~0.23 bps to 1 bps, bits per symbol, MCS index table 1 for PDSCH) or in another example, eight MCS values between MCS21 and MCS28 (e.g., spectral efficiency ~3.6 bps to 5.57 bps, bits per symbol, MCS index table 1 for PDSCH). In another example, a 3-bit reduced granularity MCS can indicate MCS0/4/8/12/16/20/24/28 (e.g., spectral efficiency ~0.23 bps to 5.57 bps, bits per symbol, MCS index table 1 for PDSCH). In other words, when the granularity is reduced one or more MCS indexes within a range of predefined MCS indexes may be skipped.

The reduced range and/or granularity of the MCS field may be explicitly configured by higher layers such as by network node 16 or another entity in system 10.

In some embodiments, the same MCS value is used for both TBs on the same carrier, and a delta-MCS field used to indicate the MCS for both TBs of the other carrier. In some embodiments, an MCS field of size X1 bits (for example, $X1 \le 5$) is used for the MCS field of the first TB on the first cell. An MCS field of size X2 bits (for example, $X2 \le X1$) is used for the MCS field of the first TB on the second cell. If a second TB is configured on cell i, the MCS field size of the first TB on cell i shrinks to $X1' < X1$. The MCS field for the second TB on cell i is encoded with $Y1 \le X1'$ bits, either as an absolute MCS or a delta MCS.

In some embodiments, if a retransmission is scheduled, the mapping from of the value of the MCS fields to MCS index is configured to such as by network node 16 to be changed or different. For example, for initial transmission the values 0 to 7 of a 3-bit MCS field maps to the MCS indexes 14/16/18/20/22/24/26/28 and for retransmissions the values map to the MCS indexes 0/2/4/6/8/10/12/14 (MCS index table 1 for PDSCH).

The relative MCS offset value indicated by the delta-MCS field may be pre-determined or explicitly configured via higher layers.

An example is shown in TABLE 1, where the MCS of TB2 is determined using the Delta-MCS and MCS indicated for TB1. Thus, for example, if MCS of TB1 is MCS 29 (corresponding to rate 948/1024, 64QAM—quadrature amplitude modulation), and delta MCS is given/indicated by 11, the MCS of TB2 is 29−1=28 (corresponding to rate 910/1024, 64QAM). This is assuming MCS index table 1 for PDSCH.

TABLE 1

| delta − MCS | $MCS_{TB2} - MCS_{TB1}$ |
|---|---|
| 00 | +0 |
| 01 | +1 |
| 10 | +2 |
| 11 | −1 |

Another example is shown in TABLE 2, where the MCS of TB2 is determined by wireless device 22 using the Delta-MCS and MCS indicated for TB1.

TABLE 2

| delta − MCS | $MCS_{TB2} - MCS_{TB1}$ |
|---|---|
| 00 | First value configured via higher layers |
| 01 | Second value configured via higher layers |
| 10 | Third value configured via higher layers |
| 11 | Fourth value configured via higher layers |

Figure 11:
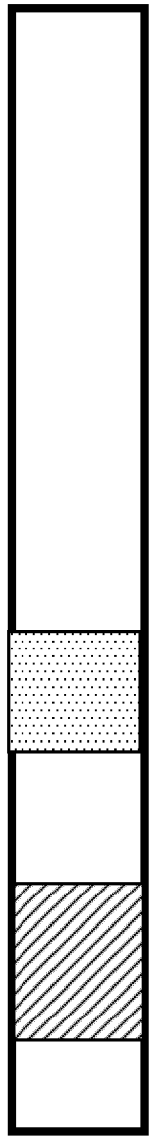
FIG. 11 is a diagram of one example of DCI scheduling multiple cells and multiple TBs according to some embodiments of the present disclosure.

One example of DCI scheduling multiple cells and multiple TBs with MCS and delta-MCS is illustrated in FIG. 11. In FIG. 11, the MCS for first TB on component carrier (CC), CC1 is given/indicated by network node 16 by $MCS_{CC1-TB1}$ and the MCS for first TB on CC2 is derived by wireless device 22 based on $MCS_{CC1-TB1}$ and Delta-$MCS_{CC2-TB1}$.

Figure 12:
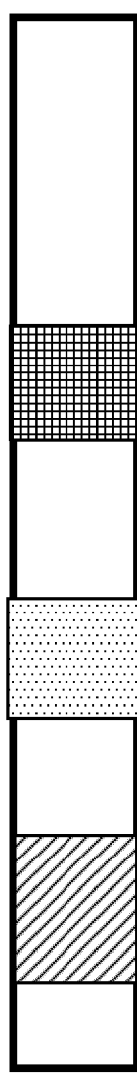
FIG. 12 is a diagram of another example of DCI scheduling multiple cells and multiple TBs according to some embodiments of the present disclosure.

Another example of DCI scheduling multiple cells and multiple TBs with MCS and delta-MCS is illustrated in FIG. 12. In FIG. 12, the MCS for first TB on CC1 is given/indicated by network node 16 by $MCS_{CC1-TB1}$. The MCS for first TB on CC2 is derived by wireless device 22 based on $MCS_{CC1-TB1}$ and Delta-$MCS_{CC2-TB1}$. The MCS for second TB on CC1 is derived based on $MCS_{CC1-TB1}$ and Delta-$MCS_{CC1-TB2}$.

Another example of DCI scheduling multiple cells and multiple TBs with MCS and delta-MCS is illustrated in FIG. 13. In FIG. 13, the MCS for first TB on CC1 is given/indicated, by network node 16, by $MCS_{CC1-TB1}$. The MCS for first TB on CC2 is derived by wireless device 22 based on $MCS_{CC1-TB1}$ and Delta-$MCS_{CC2-TB1}$. The MCS for second TB on CC1 is derived by wireless device 22 based on $MCS_{CC1-TB1}$ and Delta-$MCS_{CC1-TB2}$. The MCS for second TB on CC2 is derived by wireless device 22 based on $MCS_{CC1-TB1}$ and Delta-$MCS_{CC2-TB2}$. In another example, the MCS for second TB on CC2 is derived by wireless device 22 based on $MCS_{CC1-TB1}$, Delta-$MCS_{CC2-TB1}$ and Delta-$MCS_{CC2-TB2}$.

Another example of DCI scheduling multiple cells and multiple TBs with MCS and delta-MCS is illustrated in FIG. 14. In FIG. 14, the MCS for first TB on CC1 is given/indicted, by network node 16 by MCSCC1-TB1. The MCS for first TB on CC2 is given/indicated by MCSCC2-TB1. The MCS for second TB on CC1 is derived by wireless device 22 based on MCSCC1-TB1 and Delta-MCSCC1-TB2. The MCS for second TB on CC2 is derived by wireless device 22 based on MCSCC2-TB1 and Delta-MCSCC2-TB2.

EXAMPLES

Example A1. A network node 16 configured to communicate with a wireless device 22, the network node 16 configured to, and/or comprising a radio interface 62 and/or comprising processing circuitry 68 configured to: indicate a first modulation and coding scheme (MCS) associated with first transport block (TB) for a first carrier and a second MCS associated with a second TB for a second carrier, the first MCS being indicated by a first MCS field size and the second MCS being indicated by a second MCS field size smaller than the first MCS field size.

Example A2. The network node 16 of Example A1, wherein the second MCS is configured to be derived based at least on the first MCS.

Example A3. The network node 16 of any one of Examples A1-A2, wherein the second MCS field size has at least one of a reduced range and reduced granularity compared to the first MCS field size.

Example A4. The network node 16 of any one of Examples A1-A3, wherein the first MCS field size is configured to be mapped to a first MCS index based on the first MCS being associated with an initial transmission; and the first MCS field size is configured to be mapped to a second MCS index based on the first MCS being associated with a retransmission.

Example B1. A method implemented in a network node 16 that is configured to communicate with a wireless device 22, the method comprising: indicating a first modulation and coding scheme (MCS) associated with first transport block (TB) for a first carrier and a second MCS associated with a second TB for a second carrier, the first MCS being indicated by a first MCS field size and the second MCS being indicated by a second MCS field size smaller than the first MCS field size Example B2. The method of Example B1, wherein the second MCS is configured to be derived based at least on the first MCS.

Example B3. The method of any one of Examples B1-B2, wherein the second MCS field size has at least one of a reduced range and reduced granularity compared to the first MCS field size.

Example B4. The method of any one of Examples B1-B3, wherein the first MCS field size is configured to be mapped to a first MCS index based on the first MCS being associated with an initial transmission; and the first MCS field size is configured to be mapped to a second MCS index based on the first MCS being associated with a retransmission.

Example C1. A wireless device 22 configured to communicate with a network node 16, the wireless device 22 configured to, and/or comprising a radio interface 82 and/or processing circuitry 84 configured to: receive at least one indication of a first modulation and coding scheme (MCS) associated with first transport block (TB) for a first carrier and a second MCS associated with a second TB for a second carrier, the first MCS being indicated by a first MCS field size and the second MCS being indicated by a second MCS field size smaller than the first MCS field size.

Example C2. The wireless device 22 of Example C1, wherein the processing circuitry 84 is configured to derive the second MCS based at least on the first MCS.

Example C3. The wireless device 22 of any one of Examples C1-C2, wherein the second MCS field size has at least one of a reduced range and reduced granularity compared to the first MCS field size.

Example C4. The wireless device 22 of any one of Examples C1-C3, wherein the processing circuitry 84 is further configured to: map the first MCS field size to a first MCS index based on the first MCS being associated with an initial transmission; and map the second MCS field size to a second MCS index based on the second MCS being associated with a retransmission.

Example D1. A method implemented in a wireless device 22 that is configured to communicate with a network node 16, the method comprising: receiving at least one indication of a first modulation and coding scheme (MCS) associated with first transport block (TB) for a first carrier and a second MCS associated with a second TB for a second carrier, the first MCS being indicated by a first MCS field size and the second MCS being indicated by a second MCS field size smaller than the first MCS field size.

Example D2. The method of Example D1, further comprising deriving the second MCS based at least on the first MCS.

Example D3. The method of any one of Examples D1-D2, wherein the second MCS field size has at least one of a reduced range and reduced granularity compared to the first MCS field size.

Example D4. The method of any one of Examples D1-D3, further comprising:
mapping the first MCS field size to a first MCS index based on the first MCS being associated with an initial transmission; and mapping the second MCS field size to a second MCS index based on the second MCS being associated with a retransmission.

Therefore, one or more embodiments described herein allow for compact MCS indication for DCI scheduling multiple cells by reducing the size of the MCS field (reducing payload), utilizing a combination reduced MCS range and granularity and direct and/or relative (delta) indexing.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method implemented by a wireless device that is configured to communicate with a network node, the method comprising:

receiving, in downlink control information, DCI, an indication of a first modulation and coding scheme, MCS, associated with a first transport block, TB;

receiving, in the DCI, an indication of a second MCS associated with a second TB, the first MCS being indicated by a first MCS field size and the second MCS being indicated by a second MCS field size less than the first MCS field size, wherein the second MCS field size has at least one of a reduced MCS value range and reduced MCS value granularity compared to the first MCS field size; and communicating with the network node based on the first MCS and the second MCS, the reduced MCS value range of the second MCS field size being configured based at least on at least one transmission characteristic associated with the DCI that indicates the second MCS.

2. The method of claim 1, wherein the at least one transmission characteristic indicates one of:
 a retransmission is performed with a DCI type different from a DCI type associated with the second MCS; and
 the DCI associated with the second MCS field size schedules an initial transmission.

3. The method of claim 2, wherein the reduced MCS value granularity corresponds to at least one predefined MCS value within a predefined MCS value range being skipped.

4. The method of claim 1, wherein the second MCS field size is configured to be mapped to a MCS index based at least on the second MCS being associated with one of an initial transmission and a retransmission.

5. The method of claim 1, wherein the first MCS corresponds to a first MCS value; and
 the second MCS corresponds to a second MCS value that is an offset from the first MCS value.

6. The method of claim 1, wherein the second MCS is either:
 derived based at least on the first MCS; or
 indicated by the second MCS field.

7. The method of claim 1, wherein the reduced MCS value granularity corresponds to at least one predefined MCS value within a predefined MCS value range being skipped.

8. The method of claim 1, wherein the second MCS field size is mapped to an MCS index based at least on the second MCS being associated with one of an initial transmission and a retransmission.

9. The method of claim 1, wherein the first MCS is associated with communication on a first cell and the second MCS is associated with communication on a second cell.

10. A method implemented by a network node that is configured to communicate with a wireless device, the method comprising:
 indicating, in downlink control information, DCI, a first modulation and coding scheme, MCS, associated with a first transport block, TB;
 indicating, in the DCI, a second MCS associated with a second TB, the first MCS being indicated by a first MCS field size and the second MCS being indicated by a second MCS field size less than the first MCS field size, wherein the second MCS field size has at least one of a reduced MCS value range and reduced MCS value granularity compared to the first MCS field size; and
 communicating with the wireless device based on the first MCS and the second MCS, the reduced MCS value range of the second MCS field size being configured based at least on at least one transmission characteristic associated with the DCI that indicates the second MCS.

11. The method of claim 10, wherein the at least one transmission characteristic indicates one of:
 a retransmission is performed with a DCI type different from a DCI type associated with the second MCS; and
 the DCI associated with the second MCS field size schedules an initial transmission.

12. The method of claim 10, wherein the reduced MCS value granularity corresponds to at least one predefined MCS value within a predefined MCS value range being skipped.

13. The method of claim 10, wherein the second MCS field size is configured to be mapped to a MCS index based at least on the second MCS being associated with one of an initial transmission and a retransmission.

14. The method of claim 10, wherein the first MCS is associated with communication on a first cell and the second MCS is associated with communication on a second cell.

15. A wireless device configured to communicate with a network node, the wireless device comprising:
 processing circuitry configured to:
  receive, in downlink control information, DCI, an indication of a first modulation and coding scheme, MCS, associated with a first transport block, TB;
  receive, in the DCI, an indication of a second MCS associated with a second TB, the first MCS being indicated by a first MCS field size and the second MCS being indicated by a second MCS field size less than the first MCS field size, wherein the second MCS field size has at least one of a reduced MCS value range and reduced MCS value granularity compared to the first MCS field size; and
  communicate with the network node based on the first MCS and the second MCS, the reduced MCS value range of the second MCS field size being configured based at least on at least one transmission characteristic associated with the DCI that indicates the second MCS.

16. The wireless device of claim 15, wherein the at least one transmission characteristic indicates one of:
 a retransmission is performed with a DCI type different from a DCI type associated with the second MCS; and
 the DCI associated with the second MCS field size schedules an initial transmission.

17. A network node configured to communicate with a wireless device, the network node comprising:
 processing circuitry configured to:
  indicate, in downlink control information, DCI, a first modulation and coding scheme, MCS, associated with a first transport block, TB;
  indicate, in the DCI, a second MCS associated with a second TB, the first MCS being indicated by a first MCS field size and the second MCS being indicated by a second MCS field size less than the first MCS field size wherein the second MCS field size has at least one of a reduced MCS value range and reduced MCS value granularity compared to the first MCS field size; and
  communicate with the wireless device based on the first MCS and the second MCS, the reduced MCS value range of the second MCS field size being configured based at least on at least one transmission characteristic associated with the DCI that indicates the second MCS.

18. The network node of claim 17, wherein the at least one transmission characteristic indicates one of:
 a retransmission is performed with a DCI type different from a DCI type associated with the second MCS; and the DCI associated with the second MCS field size schedules an initial transmission.

* * * * *